April 13, 1965 H. W. WAGEMANN 3,178,004

DRIVE CONTROL MEANS FOR ROTARY PRINT HEAD

Filed Dec. 22, 1960 8 Sheets-Sheet 1

INVENTOR.
HEINRICH W. WAGEMANN

BY

George V. Hull

ATTORNEY

DRIVE CONTROL MEANS FOR ROTARY PRINT HEAD

Filed Dec. 22, 1960 8 Sheets-Sheet 2

INVENTOR.
HEINRICH W. WAGEMANN

BY George V. Hall

ATTORNEY

INVENTOR.
HEINRICH W. WAGEMANN
BY George V. Hall
ATTORNEY

April 13, 1965 H. W. WAGEMANN 3,178,004

DRIVE CONTROL MEANS FOR ROTARY PRINT HEAD

Filed Dec. 22, 1960 8 Sheets-Sheet 4

INVENTOR.
HEINRICH W. WAGEMANN

BY George V. Hall

ATTORNEY

April 13, 1965 H. W. WAGEMANN 3,178,004

DRIVE CONTROL MEANS FOR ROTARY PRINT HEAD

Filed Dec. 22, 1960 8 Sheets-Sheet 5

INVENTOR.
HEINRICH W. WAGEMANN

BY

George V. Hall
ATTORNEY

INVENTOR.
HEINRICH W. WAGEMANN
BY
Beryl V. Hall
ATTORNEY

INVENTOR.
HEINRICH W. WAGEMANN
BY
Geryl V. Hall
ATTORNEY

INVENTOR.
HEINRICH W. WAGEMANN
BY
George V. Hall
ATTORNEY

United States Patent Office 3,178,004

Patented Apr. 13, 1965

3,178,004
DRIVE CONTROL MEANS FOR ROTARY PRINT HEAD

Heinrich W. Wagemann, West Orange, N.J., assignor to Monroe International Corporation, a corporation of Delaware Filed Dec. 22, 1960, Ser. No. 77,606
10 Claims. (Cl. 197—18)

This invention relates to printing mechanism and more particularly to such mechanism employing a rotary type printing head which is successively arrested from rotation in selected printing positions.

It is the primary object of the invention to provide printing mechanism of the above type which is of compact structure and which is particularly positive in operation.

A more specific object of the invention is to provide a novel drive train for a rotary printing head and control means for the drive train which is most effective and positive in operation.

A further object of the invention is to achieve maximum acceleration and deceleration of the rotary printing head and thereby reduce the selection time for each printing operation.

Another object of the invention is to provide a printing mechanism of the above type which is particularly adapted for shifting operation with respect to the platen of a paper carriage.

Another object of the invention is to provide printing mechanism of the above type which may be readily incorporated in an accounting machine for descriptive typing in conjunction with printing of the machine calculations.

The rotary type printing head of the printing mechanism is continuously driven at a constant speed between selecting and printing operations by a drive train which is connected to a motor by a positive acting selection clutch. Each operation of selection means is operable to disengage the clutch and arrest its driven member at a predetermined point in a cycle thereby arresting rotation of the printing head in a corresponding printing position. The selection means, in addition to arresting rotation of the printing head, is further operable to shift the head axially to bring one of a plurality of bands of type characters to printing line position. After operation of the selection means, detent means is operable to accurately locate the printing head and effect the printing operation. Following the printing operation, the clutch is reengaged and the printing head is shifted one position to the right. Another selecting and printing operation may then be effected. The invention however will best be understood from the following description of a preferred embodiment thereof with reference to the accompanying drawings in which:

*The printing head*

Figures 1, 7A:
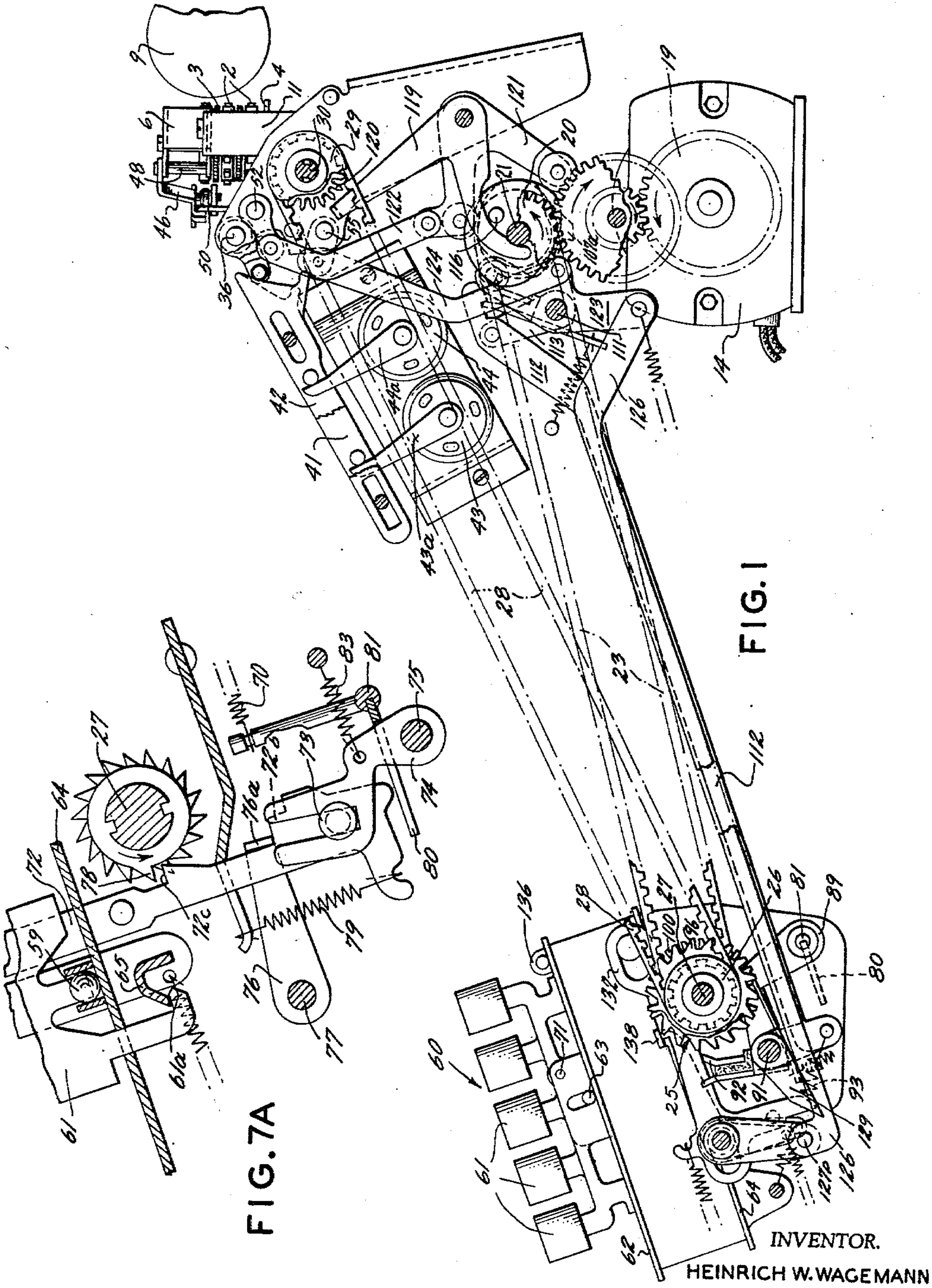
FIG. 1 is a side elevation of the printing mechanism and the selection mechanism therefor.
FIG. 7A is a fragmentary detail of parts of FIG. 7 in an operated position.
Figure 2:
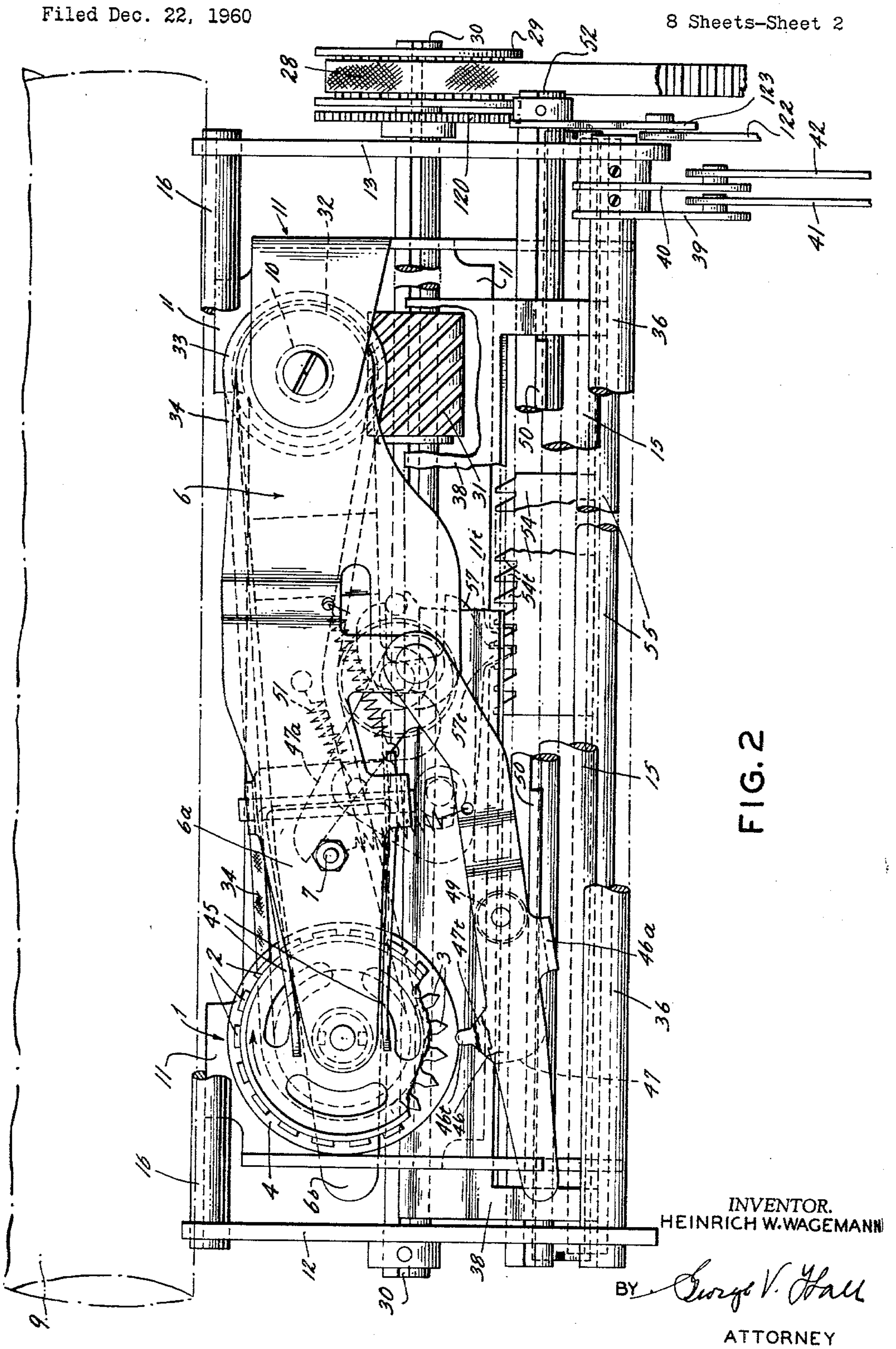
FIG. 2 is a plan view of the printing head, the detenting and actuating means therefor and the carriage on which the head is mounted.
Figure 3:
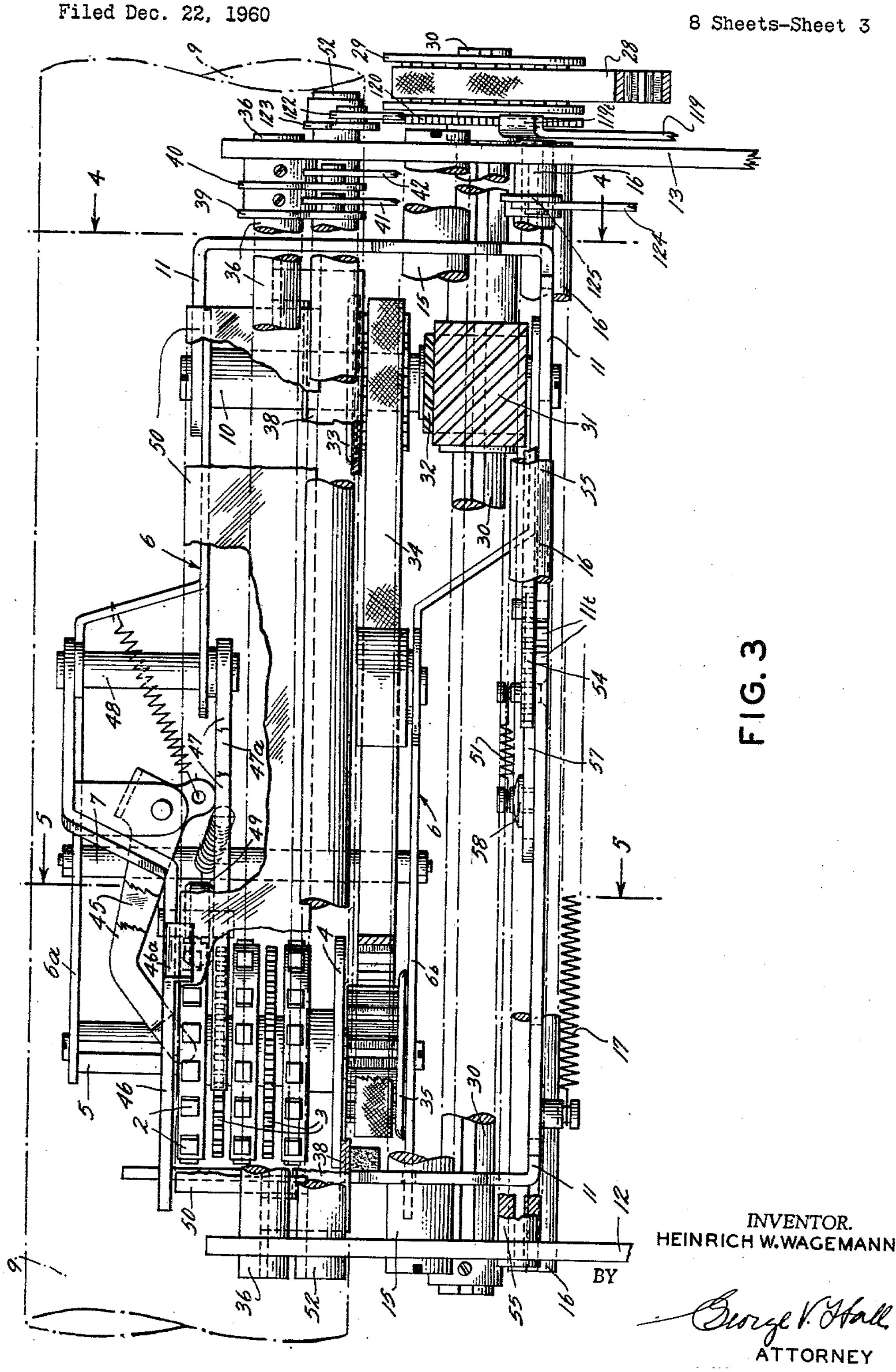
FIG. 3 is a front elevation of the parts of FIG. 2.
Figure 5:
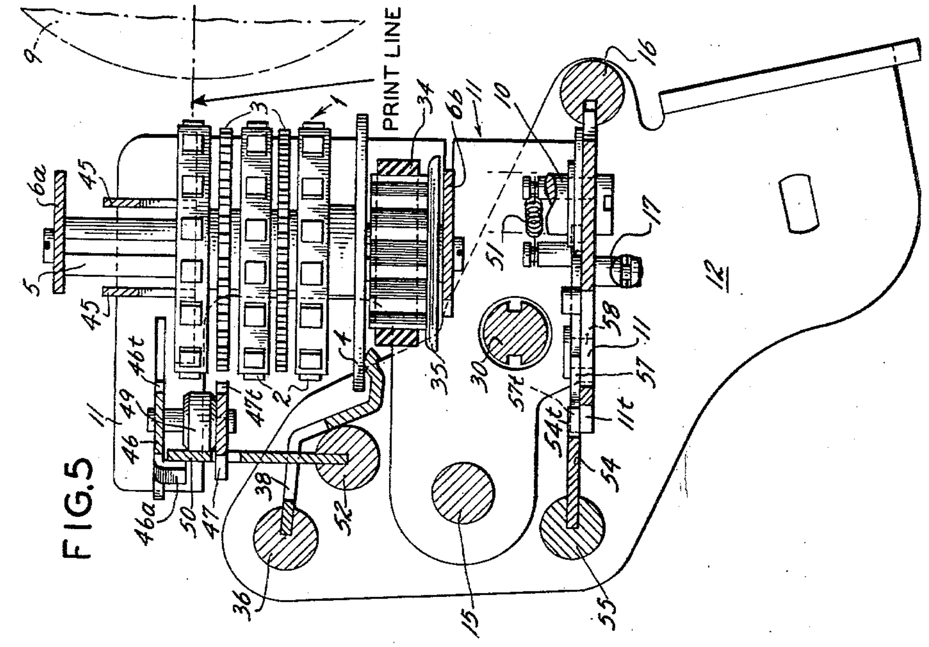
FIG. 5 is a section taken on the line 5—5 of FIG. 3.
Figure 4:
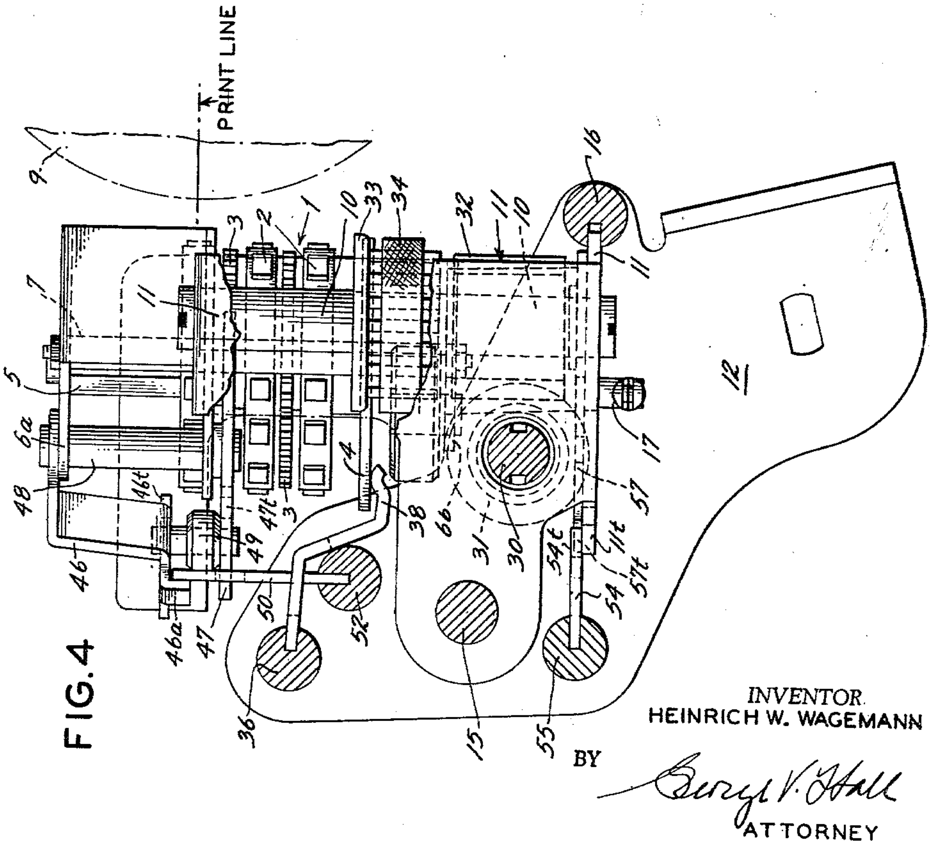
FIG. 4 is a section taken on the line 4—4 of FIG. 3.

The rotary printing head 1 (FIGS. 1–5) includes an upper, middle and lower peripherical band of type 2, detent wheels 3 between the adjacent bands of type, and an adjusting disc 4 below the lower band of type. These parts comprising head 1 are secured together, in any suitable manner, and are splined as a unit for axial adjustment on a drive shaft 5 which is rotatably mounted between the left ends of an upper arm 6*a* and an opposed lower arm 6*b* of a yoke 6. To insure rigidity, a post 7 extends between arms 6*a*, 6*b*. The particular characters of the type 2, shown by the square raised areas, are not indicated.

Printing head 1 is normally in a lowered position on shaft 5 with the upper band of type 2 at printing line position (FIGS. 4, 5) with respect to a platen 9. As later described, the printing head may be selectively adjusted upwardly to either of two positions to bring the middle or the lower band of type 2 to printing line position. With a selected one of the three bands of type at printing line position, the head 1 is arrested in rotation to locate a selected one of the type of the selected band in printing position. Immediately following this, actuating means, later described, will effect the printing operation.

The diameter of printing head 1 is chosen in consideration of compactness, inertia, etc. Obviously, with a given diameter head, one or a plurality of bands of type may be required to accommodate a given number of type characters. Therefore, in accordance with the invention, the printing head may include one or a plurality of type bands.

*The carriage for the printing head*

Yoke 6, on which drive shaft 5 of head 1 is mounted, is pivotally mounted at its right end on a vertically disposed shaft 10 (FIGS. 2, 3) which is fixed between upper and lower plates of a shiftable carriage 11. Carriage 11 is supported for transverse shifting movement between a left side plate 12 and a right side plate 13 of the printing mechanism on a pair of shafts 15, 16 extending between said side plates. Carriage 11 is provided at each end with a forwardly extending ear (FIGS. 4, 5) through which shaft 15 passes with a sliding fit whereas shaft 16 is provided with a longitudinal slot which is engaged by a rear extension at the bottom of the carriage in a sliding fit. Carriage 11 therefore is supported on shafts 15, 16 for shifting movement between side plates 12, 13.

Carriage 11 is biased for shifting movement toward the right by a spring 17 (FIG. 3) but is noramlly restrained by an escapement mechanism later described.

*Drive train for rotating the printing head*

A drive train (FIGS. 1, 2, 3, 6) from a motor 14 is operable to rotatably drive printing head 1 clockwise (FIG. 2) in any shifted position of carriage 11. The drive train comprises a gear 19 driven counterclockwise (FIG. 1) by the motor and which, through a pair of idler gears, drives a gear 20 counterclockwise. Gear 20 is fast on a shaft 21 journalled in the machine framing and on which is secured a cog wheel 22. Cog wheel 22 drives a forwardly extending cog belt 23 which, at the front of the machine, drives a cog wheel 24 fast on a shaft 27 extending across the machine and journalled in the framing. The driving member of a clutch 25 (FIG. 6) is fast on shaft 27 and the driven member of the clutch drives a cog wheel 26.

Clutch 25 and selection means to control its operation will be described later. At present, it will be noted that the selection mechanism is operable to disengage clutch 25 and arrest rotation of cog wheel 26 in any selected one of a plurality of positions. Accordingly, printing head 1 will be arrested in a corresponding rotational position to locate a selected type 2 in printing position.

Cog wheel 26 drives a cog belt 28 which returns to the rear of the machine and there drives a cog wheel 29. Cog wheel 29 is fixed on the right end of a spline shaft 30 exteriorly of the right side plate 13. Shaft 30 extends transversely (FIGS. 2, 3) between side plates 12 and 13 through suitable openings in the ends of carriage 11 and is journalled in said side plates.

A helical gear 31 is splined on shaft 30 and therefore may be shifted axially along the shaft and driven by the shaft in any shifted position. Helical gear 31 engages a helical gear 32 rotatably mounted at the lower end of shaft 10 which, as will be recalled, is vertically mounted at the right end of carriage 11 and rotatably supports yoke 6. A cog wheel 33 is located above gear 32 (FIG. 3) and is connected therewith for rotation on shaft 10. A cog belt 34 is driven by cog wheel 33 and extends toward the left to drive a cog wheel 35 which is fixed on shaft 5 below printing head 1.

When carriage 11 is shifted, gear 31 meshing with gear 32 in the carriage, will be shifted on spline shaft 30. Clutch 25 is normally engaged and therefore when the motor is operated the afore-described drive train is normally operable to rotatably drive printing head 1 in any shifted position of the carriage. It will be noted that the cog wheels, gears and shafting of the drive train between the printing head and shaft 21 are driven at a one to one ratio.

*Means for raising the printing head*

As previously stated, printing head 1 is normally in lowered position with the upper band of type 2 at printing line position and means is selectively operable to raise the head axially on shaft 5 to bring either the middle or lower band of type to printing line position. The means for raising head 1 includes a rock shaft 36 (FIGS. 2, 4, 5) extending transversely between side plates 12, 13 forwardly of head 1 and journalled in said plates. A transverse bail 38 is carried by shaft 36 and extends rearwardly with its rear edge engaging the underside of adjusting disc 4 of head 1. This engagement will be maintained in any shifted position of carriage 11. Accordingly, if shaft 36 is rocked counterclockwise, bail 38 will be operable to raise head 1.

Means for rocking shaft 36 includes a pair of cranks 39 and 40 (FIGS. 1, 2, 3, 11) fixed on the shaft adjacent its right end. Cranks 39, 40 extend forwardly and each is provided at its end with an operating stud.

The operating stud of crank 39 is engaged by a cam edge at the rear of a forwardly extending cam slide 41 whereas the stud of crank 40 is engaged by a cam edge of a slide 42. A pair of rotary solenoids 43, 44 (FIGS. 1, 7) which may be of the well-known Ledex type, are mounted below slides 41, 42. An upstanding arm **43*a* is rocked clockwise upon operation of solenoid 43 and an arm 44*a* is rocked upon operation of solenoid 44. Arm 43*a* engages a pin projecting from the side of slide 41. Consequently, when arm 43*a* is rocked, slide 41 will be moved rearwardly and its cam edge engaging the stud of crank 39 will rock the crank and shaft 36 counterclockwise. This will raise bail 38 a distance which will raise head 1 to bring the middle band of type 2 to printing line position. In like manner when arm 44*a* is rocked, cam slide 42 will be operated to rock crank 40 and shaft 36 to raise bail 38 a distance which will raise head 1 to bring the lower band of type 2 to printing line position. When the operated solenoid 43 or 44 is deenergized, a pair of spring urged fingers 45 (FIGS. 2, 3, 5) engaging the upper face of head 1 will positively restore the parts. Solenoids 43, 44** are controlled by the selection mechanism later described.

*Detenting and actuating means for the printing head*

An upper detent comprising an arm 46 (FIGS. 2–5) and a lower detent comprising an arm 47 have common pivotal mounting 48 on a pair of vertically spaced lugs intermediate the ends of upper arm **6*a* of yoke 6. Arms 46, 47 extend toward the left in vertically spaced relationship forwardly of printing head 1, and intermediate their ends the arms are connected for simultaneous operation by a roller 49**.

Detent teeth **46*t*, 47*t* at the rear of arms 46, 47 respectively are adapted to engage detent wheels 3 of printing head 1. When head 1 is in normal lowered position, as shown in the drawings, with the upper band of type 2 at printing line position, tooth 46*t* will be ineffectively positioned above head 1 whereas tooth 47*t* will be in the plane of upper detent wheel 3. When head 1 is raised to locate the middle band of type 2 at printing line position, tooth 46*t* will be in the plane of upper detent wheel 3 and tooth 47*t* will be in the plane of lower detent wheel 3. And when head 1 is raised to locate the lower band of type 2 at printing line position, tooth 46*t* will be in the plane of lower detent wheel 3 and tooth 47*t* will be ineffectively positioned below the head. To insure proper location and support for arms 46, 47, the left extended end of arm 46 engages a guide slot in the left end of carriage 11**.

An ear **46*a* extends downwardly from the front edge of arm 46 forwardly of roller 49. The upper edge of a transverse bail 50 passes between ear 46*a* and roller 49 and will engage said ear and roller in any shifted position of carriage 11. Bail 50 is supported at its lower edge by a transverse shaft 52 extending longitudinally beneath bail 38 which is cut away to permit vertical passage of said bail 50. Shaft 52 is journalled in side plates 12, 13 and is normally in counterclockwise position. Bail 50 engaging ear 46*a* and roller 49 therefore normally holds detent arms 46, 47** counterclockwise.

A spring 53 is tensioned between detent arm 46 and arm **6*a* of yoke 6. Furthermore, a subarm 47*a* normally engages post 7 which connects arms 6*a*, 6*b* of yoke 6. Therefore, yoke 6 is normally held counterclockwise with the left end of arm 6*b* limited by engagement with the front end of a guide slot in the left end of carriage 11. With detent arms 46, 47 and yoke 6 in normal counterclockwise position, detent teeth 46*t*, 47*t* will be disengaged from detent wheels 3**.

In a printing operation, later described, shaft 52 and bail 50 will be rocked clockwise and restored. Clockwise movement of bail 50 engaging roller 49 will rock detent arms 46, 47 clockwise. During the first part of clockwise movement of arms 46, 47, one or both of the detent teeth **46*t*, 47*t*, depending on the axial adjustment of head 1, will engage one or both of the detent wheels 3 to accurately locate head 1 for the printing operation. During this movement, yoke 6 will be held counterclockwise against movement by the bias of spring 53. However, upon further clockwise movement of detent arms 46, 47, printing head 1 and yoke 6 will be rocked clockwise with said detent arms to effect the printing operation. During the return counterclockwise movement of shaft 52, detent arms 46, 47 will be restored counterclockwise by bail 50 engaging ear 46*a*. Furthermore, subarm 47*a* will engage post 7 and positively restore yoke 6 and head 1**.

*Carriage escapement mechanism*

At the conclusion of a printing operation, carriage 11 (FIGS. 2–5) is escaped one position to the right to locate head 1 for another selecting and printing operation.

The escapement mechanism comprises a horizontally disposed rack 54 extending transversely at the front of carriage 11 and having teeth **54*t* along its rear edge. Rack 54 is mounted at its front edge on a transverse shaft 55 which is journalled in side plates 12, 13. Shaft 55 is rocked clockwise and return, as later described, to lower and then raise rack teeth 54***t*.

A crank 57 is mounted for pivotal movement and a degree of lateral shifting movement on the upper face of a lower plate of carriage 11. The mounting means comprises an upstanding pin 58 in carriage 11 which engages a slot in crank 57. Crank 57 is normally spring held clockwise and urged toward the right by a spring 51 with a tooth 57*t* at its forward right end engaging a tooth 54*t* of rack 54. Carriage 11 therefore will be restrained from rightward movement against the urge of spring 17. The urge of spring 17 will overcome spring 51 of crank 57. Therefore crank 57 will yield and be held to the left with respect to pin 58 with the pin engaging the right end of the slot of the crank.

At the front edge of the lower plate of carriage 11 is a pair of teeth 11*t*. These teeth 11*t* are normally immediately beneath a pair of adjacent tooth spaces of teeth 54*t* of rack 54. Therefore when shaft 55 is rocked to lower rack teeth 54*t*, tooth 57*t* of crank 57 will be disengaged and teeth 11*t* will be engaged. Carriage 11 therefore will yet be restrained from rightward movement, however released crank 57 will move toward the right under urge of spring 51 to engage the left end of its slot with pin 58. During this operation a suitable limit stop will prevent further clockwise movement of crank 57. When rack teeth 54*t* are restored, teeth 11*t* will be disengaged and tooth 57*t* reengaged. This will release carriage 11 for one step of movement toward the right as crank 57 yields and pin 58 is restored to the right end of the slot of the crank.

Carriage 11 may be restored to the left either manually or by power means (not shown). Upon leftward movement of carriage 11, crank 57 will yield counterclockwise with its tooth 57*t* clicking idly over teeth 54*t* of rack 54.

*Selection mechanism*

The selection mechanism comprises a keyboard 60 (FIGS. 1, 7, 7A) located at the front of the machine. The stems of keys 61 of the keyboard include main sections which extend downwardly in transverse alignment through guide slots in an upper plate 62 of the keyboard. A transverse rod 63 extends across plate 62 through guide slots in the key stems to limit the movement of the keys. A reduced lower end of each key stem extends downwardly through a lower plate 64 of the keyboard and terminates in a rearwardly extending nose 61*a*. Noses 61*a* normally engage the upper inclined forward side of a transverse bail 65. Bail 65 is spring urged clockwise and is supported at its ends at the lower ends of a pair of vertical arms which are pivotally mounted at their upper ends on rod 63. Therefore upon depression of a key 61, bail 65 will be operated to move above nose 61*a* of the key to hold it depressed (FIG. 7A). Well known interlock means 59 is operable to prevent depression of another key until retraction of a presently depressed key.

Alternate front and rear arms 61*b*, 61*c* of the stems of keys 61 extend downwardly through upper plate 62 and are engaged by springs which are seated on lower plate 64 and which normally hold the keys in retracted position. The key tops are mounted in staggered relationship on the key stems. The above arrangement of the parts permits close spacing of the key stems and therefore results in a compact keyboard structure.

Figure 7:
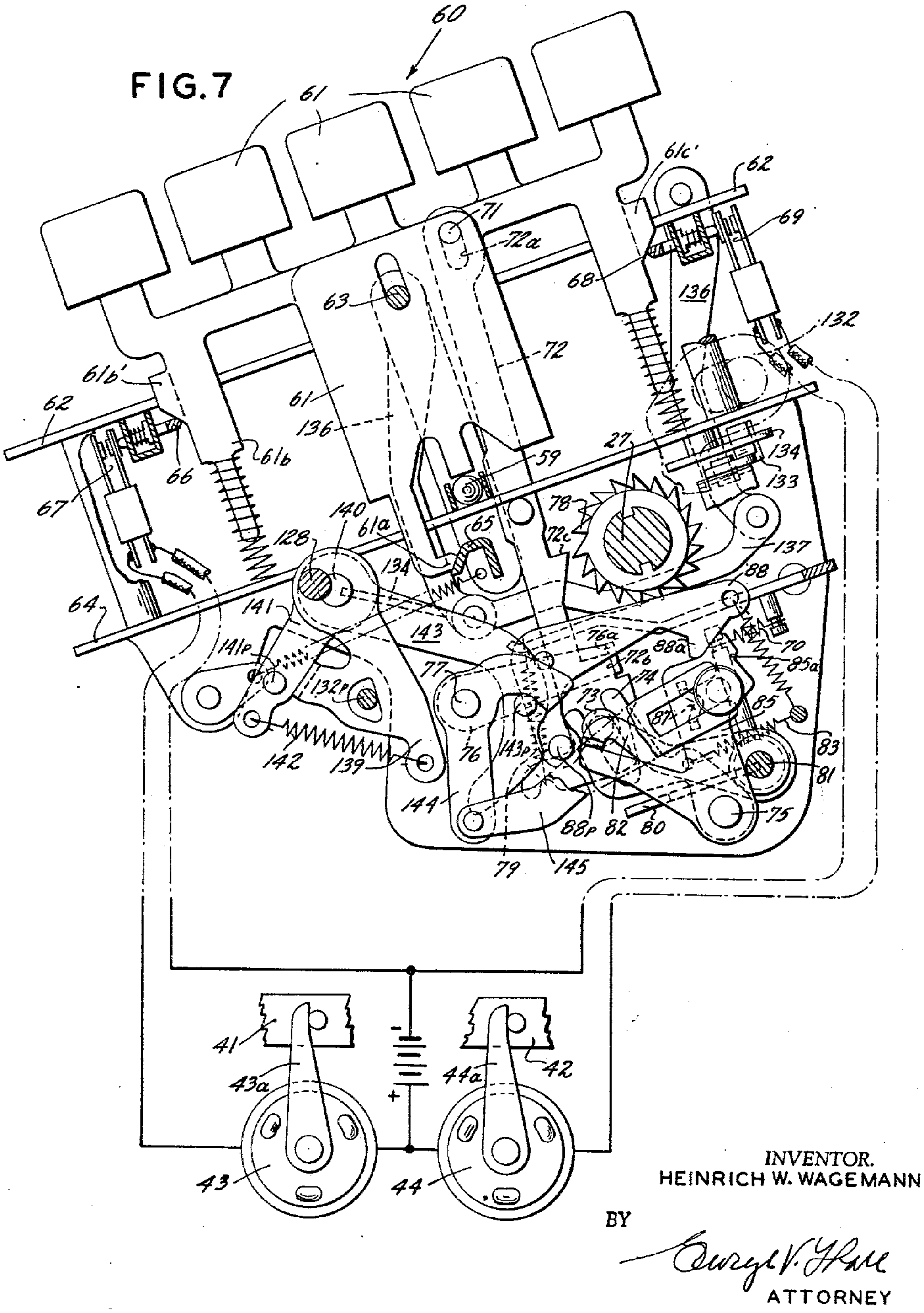
FIG. 7 is a right side view, with parts broken away, of the selection mechanism.

It will be recalled that printing head 1 includes an upper band of type 2 which is normally at printing line position, a middle band which is raised to printing line position upon operation of a solenoid 43, and a lower band which is raised to printing line position upon operation of a solenoid 44 (FIGS. 1, 7).

There is a key 61 corresponding to each type 2 of the printing head. Obviously upon depression of a key corresponding to a type of the upper band, the printing head will remain in normal lowered position. However, upon depression of a key corresponding to a type of either the middle or the lower band, circuit means (FIG. 7) will be closed to operate respectively solenoid 43 or 44.

The stems of keys 61 corresponding to the middle band of type 2 include the front arms 61*b* on which are forwardly extending cam lugs 61*b*′; whereas the stems of keys 61 corresponding to the lower band of type 2 include the rear arms 61*c* on which are rearwardly extending cam lugs 61*c*′. The stems of keys 61 corresponding to the upper band of type 2 may alternately include front and rear arms 61*b*, 61*c* which are devoid of the cam lugs.

A bail 66 extends transversely beneath cam lugs 61*b*′ and is mounted for front and rear sliding movement. Normally, spring means is operable to hold bail 66 rearwardly in engagement with the under edge of cam lugs 61*b*′. A forward extension of bail 66 engages a normally open switch 67 in a circuit for solenoid 43. Therefore upon depression of any one of keys 61 corresponding to a type 2 of the middle band, bail 66 will be moved forwardly to close switch 67 and solenoid 43 will be operated to raise the middle band of type 2 to printing line position. A bail 68 is operated in like manner upon depression of any one of the keys 61 corresponding to a type 2 of the lower band to close a switch 69 in a circuit for solenoid 44 which will be operated to raise the lower type band to printing line position.

It will be noted that solenoid 43 or 44 is operated during the first part of the stroke of the depressed key 61. Then further depression of the key will control the selection mechanism to arrest rotation of head 1 with type 2, corresponding to the depressed key, in printing position. Obviously if type 2 corresponding to the depressed key is in the upper type band there will be no axial adjustment of head 1 and the selection mechanism will operate only to arrest rotation of the head. The arresting means, and control means therefor, is constructed and operates as follows.

The stem of each key 61 has a pin 71 (FIG. 7) adjacent its top. Pin 71 engages a longitudinal slot 72*a* at the upper end of a link 72 which extends downwardly through slots in plates 62, 64 of the keyboard. Link 72 is normally held in raised position by a spring 79 with a limit pin engaging the underside of plate 64. With key 61 and link 72 in normal raised position, pin 71 will engage the upper end of slot 72*a*.

A stud 73 adjacent the lower end of each link 72 engages an open end slot at the upper end of an arm 74 which is pivotally mounted at its lower end on a shaft 75 extending transversely of the machine. Arm 74 is biased clockwise by a spring 83 and therefore biases link 72 counterclockwise about pin 71 to engage the rear edge of a shoulder 72*b* near the lower end of the link with a lug 76*a* at the right end of an arm 76 which is fixed on a transverse shaft 77.

Each link 72 is provided with a rearwardly extending lug 72*c* which is normally located forwardly of previously described shaft 27. Shaft 27, it will be recalled, is driven continuously counterclockwise by a drive train from the motor including a cog wheel 24 (FIG. 6) fast on the shaft.

Figure 6:
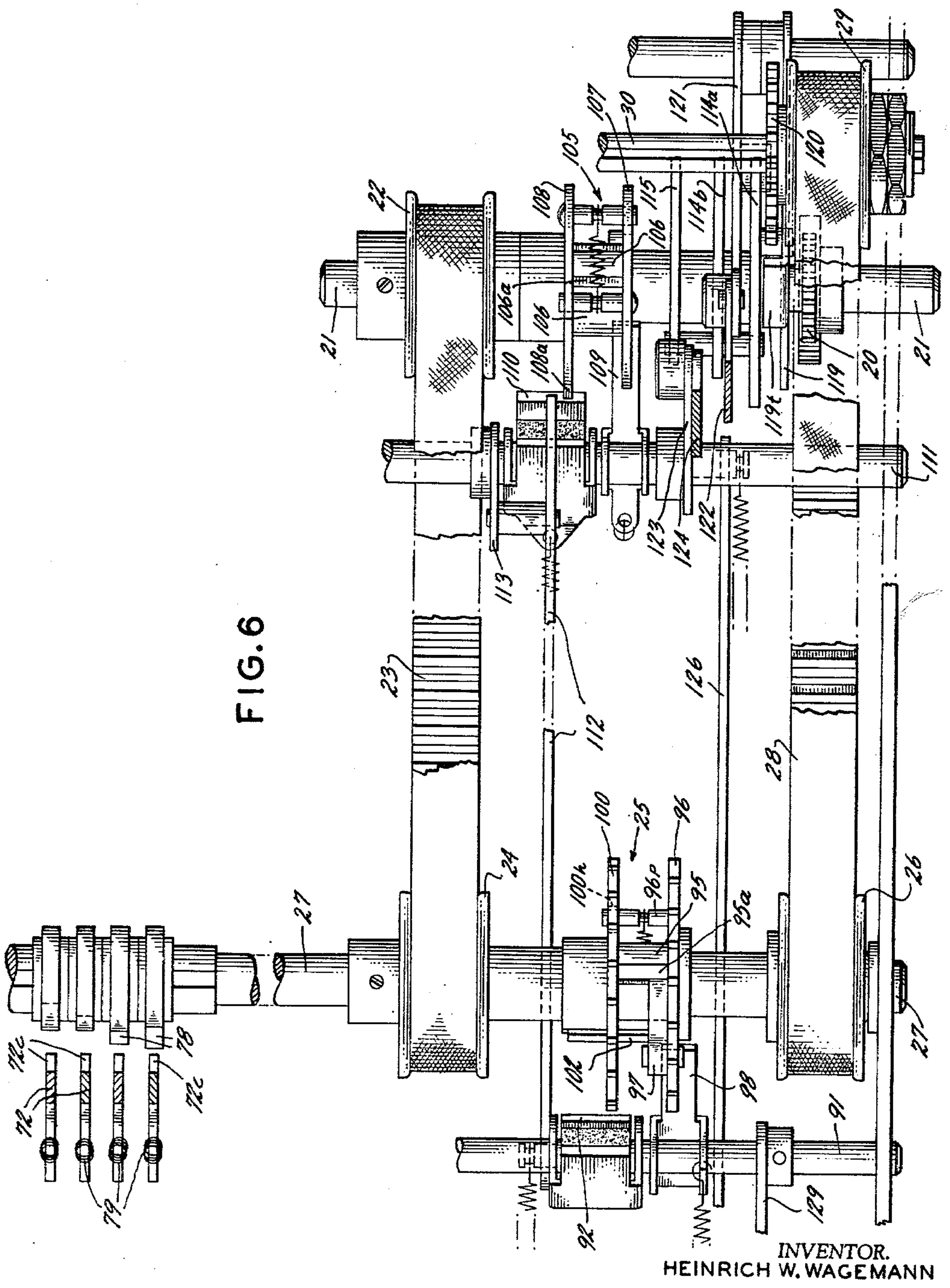
FIG. 6 is a plan view of the driving mechanism for the printing head and the controls.

In the vertical plane of each lug 72*c* is a tooth 78 carried by a ring keyed on shaft 27 to locate the tooth in a given angular or circumferential position on the shaft. Lugs 72*c* of links 72 are normally located immediately forward and out of the path of rotation of the associated teeth 78 (FIGS. 6, 7). The circumferential position of each tooth 78 on shaft 27 corresponds to the circumferential position on head 1 of the type 2 which corresponds to the key 61 related to the link 72 having the lug 72*c* in the plane of the tooth. Each of the type 2 of any one of the bands (upper, middle, or lower) is in vertical alignment with a type of the other two bands. Therefore the type are in vertical columns of three each and the type of each column have the same circumferential position on the periphery of head 1. Obviously, therefore, the teeth 78 which correspond to each column of type 2 will have the same circumferential position on shaft 27.

Clutch 25, previously noted and later described in detail, is invariably engaged with its driving and driven members in a fixed rotational relationship. Head 1 connected with the driven member of the clutch therefore will be driven with type 2 in fixed rotational relationship with respect to teeth 78 on shaft 27 which is continuously driven with the driving member of the clutch.

Upon depression of a key 61, a pin 71 will first be moved to the bottom of slot 72*a* of link 72 which will be held raised by spring 79. During this movement, solenoid 43 or 44 may or may not be operated to adjust head 1 axially, as described, depending on the band in which type 2 corresponding to the depressed key is located. Further depression of the key will move link 72 downwardly (FIG. 7A) until its lower end is immediately adjacent the upper side of a bail 80. Bail 80 is common to all of links 72 and is fixed on a rock shaft 81 extending transversely of the machine and held clockwise by a spring 70. Furthermore, in the downward movement of link 72, shoulder 72*b* thereof will be moved below restraining lug 76*a* of arm 76. As a result, arm 74 will be rocked clockwise by spring 83 and connected link 72 will be rocked counterclockwise. This will bring lug 72*c* toward the rear and into the path of rotation of the associated tooth 78 (FIG. 7A) of shaft 27. Accordingly, tooth 78 will engage lug 72*c* and move link 72 further downwardly to rock bail 80 and shaft 81 counterclockwise. This downward movement is permitted by slot 72*a*, the bottom of which is engaged by pin 71.

Means is operable upon counterclockwise movement of shaft 81 to restore link 72 clockwise thereby removing lug 72*c* from the path of rotation of tooth 78 to prevent repeated operation of the link and to permit said link to be restored upwardly by spring 79. A forwardly extending arm 82 (FIG. 7) is fast on shaft 81 adjacent the ends respectively of bail 80. A lug at the end of each arm 82 respectively engages the upper end of a forwardly extending arm of a crank 85 which is pivotally mounted on shaft 75. The other, vertically disposed, arms of cranks 85 are connected by a bail 87 which extends transversely at the rear of the lower ends of links 72. Counterclockwise movement of shaft 81 will cause arms 82 to likewise rock cranks 85 and bail 87. Bail 87 will engage the operated link 72 whereby restoring it clockwise to remove lug 72*c* from the path of rotation of tooth 78 and shoulder 72*b* from beneath lug 76*a*. Spring 79 therefore will move link 72 upwardly to engage the bottom of slot 72*a* with pin 71.

A latch in the form of a crank 88 is operable to hold bail 87 in counterclockwise operated position. Crank 88 is spring biased clockwise and has a rearwardly extending arm having a depending nose 88*a* normally resting to the front of a shoulder 85*a* on the top of the vertical arm of crank 85 which supports the right end of bail 87. Upon counterclockwise movement of cranks 85 and bail 87, nose 88*a* will drop behind shoulder 85*a* to hold the parts in operated position.

Figure 8:
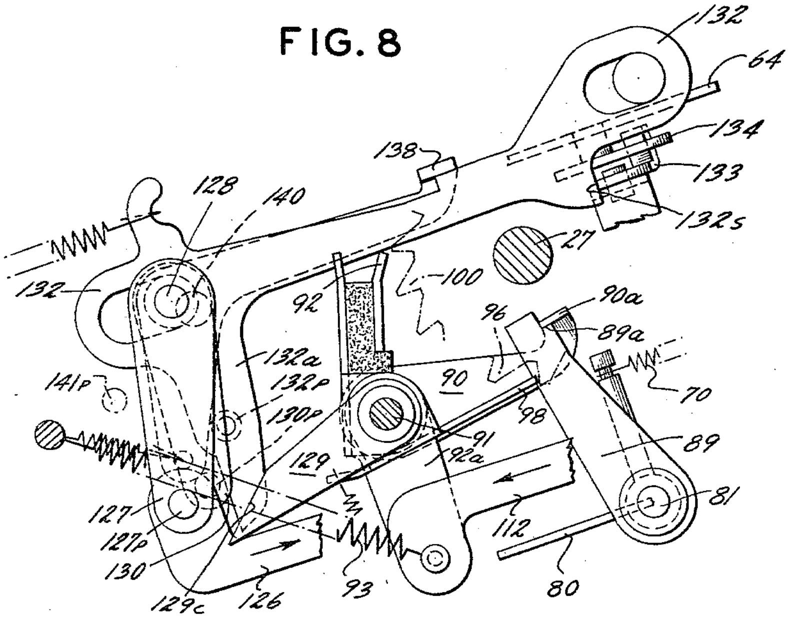
FIG. 8 is a right side fragmentary view of the controls for the selection clutch.

Counterclockwise movement of shaft 81 will release an upstanding latch arm 89 (FIG. 8) fast at the right end of the shaft. This will cause disengagement of previously noted normally engaged clutch 25 in the drive train of printing head 1 and thereby arrest rotation of the printing head for a printing operation. Latch arm 89 has a shoulder 89*a* at its upper rear end. Shoulder 89*a* is engaged by a lug 90*a* at the end of a rearwardly extending arm 90 fast on a shaft 91 which is rotatably mounted in the machine framing. A vertically disposed detent 92 is fast on shaft 91 and includes a depending arm 92*a*. A spring 93 attached to arm 92*a* biases detent 92, shaft 91, and arm 90 clockwise. However the parts are restrained by engagement of lug 90*a* with shoulder 89*a*.

Upon counterclockwise movement of shaft 81 and latch arm 89, shoulder 89*a* will be removed from engagement with lug 90*a*. Accordingly, the parts fast on shaft 91 will be released and rocked clockwise. The clockwise movement of detent 92 will operate to disengage clutch 25 which is constructed and controlled as follows.

Figures 9, 10:
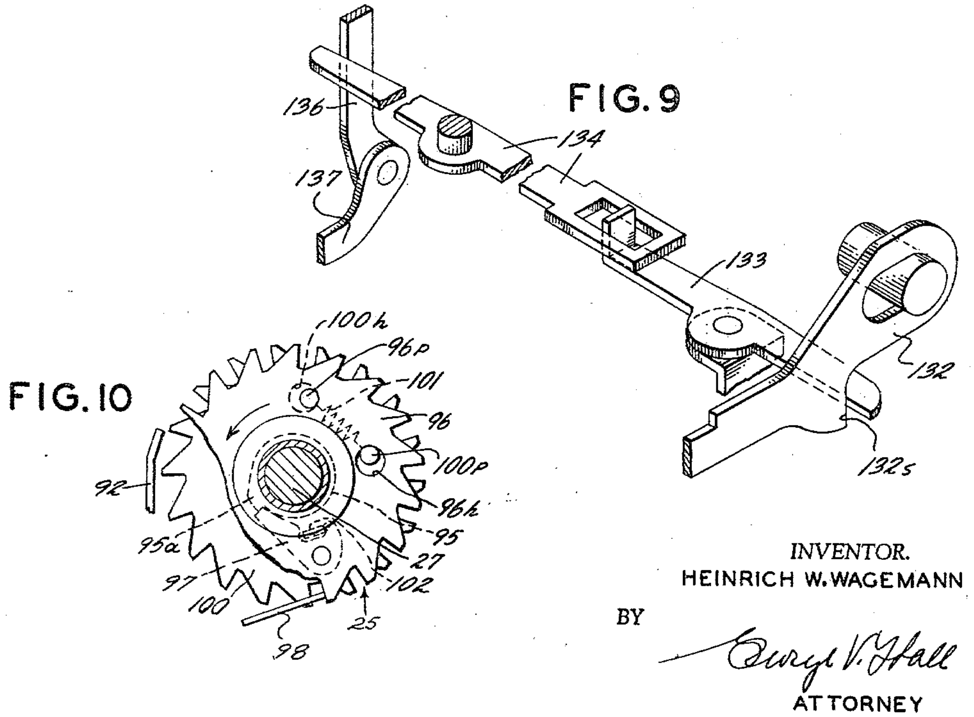
FIG. 9 is a fragmentary perspective of the keyboard releasing means.
FIG. 10 is a detailed view of the selection clutch.

The driving member for clutch 25 (FIGS. 6, 8, 10) comprises a collar 95 fast on shaft 27 and having a single tooth 95*a*. The driven member of the clutch comprises a saw toothed disc 96 loosely mounted on shaft 27 and connected by a sleeve with previously described cog wheel 26. A pawl 97 mounted on disc 96 normally engages tooth 95*a* of collar 95 and drives disc 96 and cog wheel 26 counterclockwise with shaft 27. The long inclined edges of the saw teeth of disc 96 are the leading edges, and therefore upon rotation of the disc, the teeth will click idly past a spring urged back stop detent 98 pivotally mounted on shaft 91.

Each tooth space of disc 96 of clutch 25 corresponds to a column of (three vertically aligned) type 2 of head 1 (FIGS. 2–5). When any type of a column is rotated to printing position, the corresponding tooth space will be engaged by detent 98. When clutch 25 is engaged, disc 96 will be coupled to shaft 27 by the single-toothed driving member invariably in the same rotational relationship. There is therefore a fixed rotational relationship in each cycle of rotation between the respective corresponding columns of type 2, tooth spaces of clutch disc 96, and teeth 78 of shaft 27.

Means for disengaging clutch 25 (FIGS. 6, 8, 10) thereby arresting rotation of head 1 with a type 2 corresponding to a depressed key 61 in printing position includes a saw-toothed control disc 100 of the clutch. Disc 100 is loosely mounted on shaft 27 to the left of driving member 95. A pin 96*p* extends toward the left from disc 96 and passes through a hole 100*h* of greater diameter in disc 100. A pin 100*p* extends toward the right from disc 100 and passes through a hole 96*h* of greater diameter in disc 96. A spring 101 connects pins 96*p* and 100*p*. Disc 96 therefore is urged clockwise with respect to disc 100 and disc 100 is urged counterclockwise with respect to disc 96. Such movement however is limited by engagement of pins 96*p*, 100*p* engaging the sides of holes 100*h*, 96*h* respectively. From the above, it will be seen that control disc 100 is yieldably driven counterclockwise by disc 96 through spring 101.

Means controlled by disc 100 is normally operable to maintain clutch 25 engaged. Such means comprises a finger 102 carried by disc 100. Finger 102 extends to the right from disc 100 and engages a recess of clutch pawl 97 inwardly of its pivot on driven disc 96. With finger 102 engaging the recess of pawl 97, the pawl will be held clockwise in the path of rotation of tooth 95*a* of driving member 95, and clutch 25 therefore will be engaged.

Each tooth space of disc 100 corresponds to a tooth space of disc 96 and therefore to the same corresponding column of type 2 and teeth 78 on shaft 27. The short radial edges of the teeth of disc 100 are the leading edges and therefore when detent 92 is released, as previously described, it will engage the short side of a tooth and abruptly arrest rotation of disc 100. The timing of the release of detent 92 is such that it will engage the tooth space corresponding to the column of type 2 which contains the type corresponding to the depressed key 61. It will be recalled that when detent 92 is released, head 1 will be in axially adjusted position to select the proper band of type.

When disc 100 is arrested, pawl 97 of disc 96 will yet be engaged with tooth 95*a* of the clutch driving member 95. Disc 96 therefore will be driven further counterclockwise, such movement being permitted by the yield of coupling spring 101. Pawl 97 will therefore be translated counterclockwise with respect to now stationary finger 102 which is carried by arrested disc 100 and which engages the aforenoted recess of the pawl. The recess of pawl 97 has rounded edges and therefore after a slight further counterclockwise movement of disc 96, the recess will be moved from registration with finger 102. This will rock pawl 97 counterclockwise from engagement with tooth 95*a* of driving member 95 to disengage the clutch.

Immediately prior to disengagement of the clutch, detent 98 will engage the tooth space of disc 96 corresponding to the tooth space of disc 100 engaged by detent 92. Upon disengagement of the clutch, spring 101 will rotate released disc 96 a very short distance back clockwise to firmly engage detent 98 with the short radial edge of the engaged tooth space. Printing head 1 therefore will be arrested with type 2 corresponding to depressed key 61 in printing position.

The above description of the operation of the selection means is made without consideration of lost motion in the drive train, which may be considerable, between clutch 25 and printing head 1. Detenting means for printing head 1 to exactly locate the selected type has been previously described in conjunction with actuating means for the head. Such detent means however would be inffective if the selected type were displaced a half type space or more from printing position. Intermediate detent means in the drive train is therefore operated as later described.

*Printing, carriage shifting and restoring operations*

Simultaneously with disengagement of clutch 25 to arrest rotation of printing head 1 with selected type 2 in printing position, a clutch 105 (FIGS. 6, 12) is engaged for a single cycle of operation. Mechanism operable by clutch 105 will operate the previously noted intermediate detent means, the previously described actuating and detent means for printing head 1, the previously described escapement means for the carriage on which the printing head is mounted, and means for restoring the various operated parts to normal position. Clutch 105 is of the same type and is operated and controlled substantially as previously described clutch 25. Clutch 105 differs from clutch 25 only in the number of teeth on the driving member 106, on the driven member 107, and on the control member 108.

The driving member of clutch 105 comprises collar 106 fast on shaft 21 which is continuously driven by the motor and on which cog wheel 22 is fast. It is not necessary that clutch 105 be engaged and disengaged with shaft 21 in any given rotational position. Therefore driving member 106 has a plurality of teeth 106*a* for engagement by pawl 103 of driven member 107 so that more rapid engagement of the clutch may be achieved. The clutch is engaged for a single cycle for each printing operation. Therefore member 107 has a single tooth 107*a* and member 108 has a single tooth 108*a* engaged respectively by detents 109 and 110 to disengage the clutch 105 instead of the plurality of teeth of the corresponding members of clutch 25 which provides for disengagement of that clutch in a plurality of rotational positions.

Detents 109, 110 are pivotally mounted on a shaft 111. Detent 109 is normally spring held counterclockwise in the path of rotation of tooth 107*a* of driven member 107 whereas detent 110 is spring held clockwise in the path of tooth 108*a* of control member 108. Clutch 105 therefore is engaged and disengaged by operation of detents 109, 110 in the same manner as detents 92, 98 are operable to engage and disengage clutch 25. Upon disengagement of clutch 25, clutch 105 is engaged as follows.

A forwardly extending link 112 (FIGS. 1, 6, 8, 11, 12) is pivotally supported adjacent its rear on an upstanding arm 113 which is pivotally mounted on shaft 111. The hooked rear end of link 112 overlies an upper extension of detent 110. Link 112, at its front end, is pivotally attached at the end of depending arm 92*a* (FIG. 8) of detent 92 of clutch 25. When detent 92 is rocked clockwise by spring 93 to disengage clutch 25, link 112 will be moved forwardly thereby rocking detent 110 counterclockwise against the relatively weak tension of its spring to engage clutch 105.

Figures 11, 12:
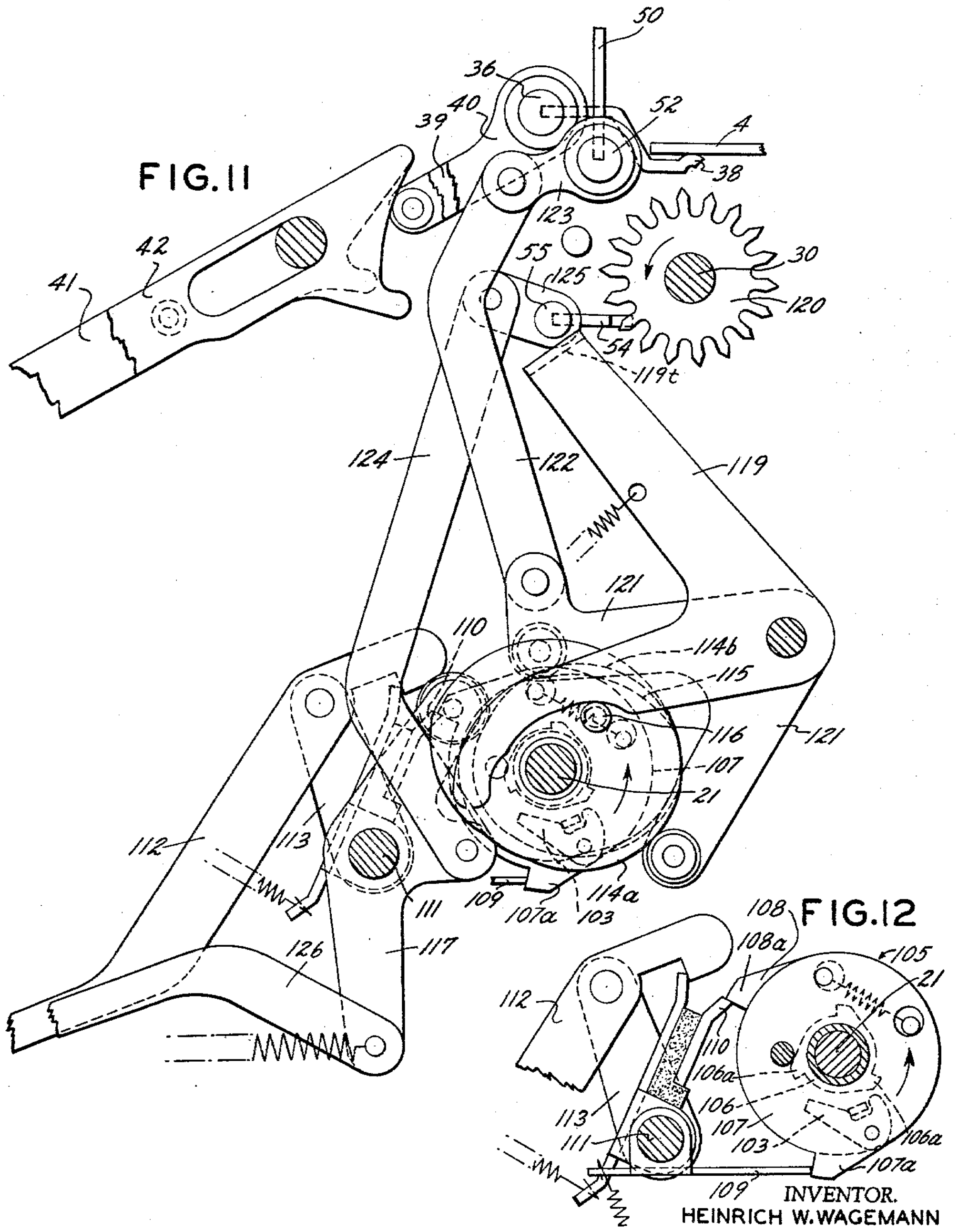
FIG. 11 is a side view of the cam operated means for effecting various operations of the printing mechanism.
FIG. 12 is a detailed view of the clutch which drives the cams and controls for the clutch.

The driven member 107 of clutch 105 is fixed on a rightwardly extending sleeve on which is fixed a pair of complemental cams 114*a*, 114*b* and a cam 115 (FIGS. 6, 11). Extending from the right of cam 114*a* is a pin 116. A detent crank 119 is normally spring held counterclockwise and has an arm extending forwardly with a cam edge engaging pin 116. The other arm of crank 119 extends upwardly and has a detent tooth 119*t* at its end adapted for engagement with a detent wheel 120 fast on shaft 30 of the drive train of printing head 1 between cog wheel 29 and gear 31 (FIG. 2) of said drive train.

A cam follower 121 has common pivotal mounting with detent crank 119. Cam follower 121 comprises a pair of opposed arms having rollers engaging respectively complemental cams 114*a* and 114*b*. Cams 114*a*, 114*b* therefore will effect positive operation of follower 121. Follower 121 has link connection 122 with a forwardly extending crank arm 123 fast on shaft 52 which, as previously described, is rocked clockwise to operate the actuating and detenting mechanism for printing head 1.

During the first part of the cycle of clutch 105, pin 116 will rock detent crank 119 clockwise to engage detent tooth 119*t* with detent wheel 120. This will adjust printing head 1 to insure that detent teeth 46*t*, 47*t* (FIGS. 2, 5) will engage the correct teeth of detent wheels 3 when the previously described detenting and actuating means for the head is operated.

Cams 114*a*, 114*b* will rock follower 121 clockwise during the first part of the cycle of clutch 105. This will raise link 122 thereby rocking arm 123 and shaft 52 clockwise to operate the actuating and detenting means for head 1 comprising bail 50 and detent arms 46, 47. This operation is timed with the operation of detent arm 119 so that detent teeth 46*t*, 47*t* will engage wheels 3 immediately after engagement of wheel 120 by tooth 119*t*. Accordingly, head 1 will be operated to print the selected character. After this, further operation of clutch 105 will restore the operated parts.

Means associated with cam 115 (FIGS. 6, 11) is operable in timed relation with the printing operation to operate the previously described carriage escapement mechanism comprising shaft 55 and rack 54. A cam follower 117 is spring urged clockwise into engagement with cam 115. A link 124 extends upwardly from follower 117 and is pivotally connected at its upper end to the end of a forwardly extending arm 125 which is fast on shaft 55.

During the first part of the cycle of clutch 105, at which time the printing operation is effected, follower 117 will be rocked counterclockwise by cam 115. This will raise link 124 and rock shaft 55 and rack 54 clockwise. This, it will be recalled, will condition the escapement means for carriage 11 for operation. During the latter part of the clutch cycle after the printing operation, the parts will be restored thereby operating the escapement mechanism. Carriage 11 therefore will be shifted one position to the right to locate head 1 for the next printing operation.

Cam follower 117 will operate to control clutch 105 for the single cycle of operation and will control means for effecting various restoring operations for the selection mechanism including reengagement of clutch 25. Cam follower 117 includes a depending arm to which the rear end of a forwardly extending link 126 (FIGS. 1, 8, 11) is attached. Link 126, at its front end, is attached by a pin 127*p* to the end of a depending arm 127 which is fast on a rock shaft 128 fulcrumed in the machine framing.

A forwardly extending cam arm 129 (FIG. 8) is fast on shaft 91 on which detent 92 is fast, and is provided with a cam edge 129*c* at its end. Therefore when detent 92 is rocked clockwise, as previously described, to disengage clutch 25, arm 129 will likewise be rocked. Link 126 will be moved rearwardly as follower 117 is rocked counterclockwise by cam 115. Near the end of this movement, pin 127*p* will engage cam edge 129*c* and restore arm 129, shaft 91, detent 92, and latch arm 90 counterclockwise. This movement of detent 92 will reengage clutch 25. Furthermore, link 112 connected with detent 92 will be restored rearwardly thereby releasing detent 110 of clutch 105 (FIGS. 11, 12). Detent 110 therefore will be moved into the path of tooth 108*a* of control disc 108 and clutch 105 will be disengaged at the end of the cycle. Also latch arm 89 released by arm 90 will be restored clockwise to engage shoulder 89*a* with lug 90*a* of said arm 90 thereby holding detent 92 of clutch 25 in clutch engaging position and detent 110 of clutch 105 in clutch disengaging position.

When link 126 (FIG. 8) is moved rearwardly, arm 127 fast on shaft 128 will rock the shaft counterclockwise. A depending arm 130 is fast on shaft 128 and has a pin 130*p* at its end adapted to engage a depending arm 132*a* at the front of a rearwardly extending slide 132 which is spring biased forwardly. Slide 132 is supported at its front by shaft 128 which extends through a slot in the slide and at its rear by a suitable stud engaging a slot adjacent that end of the slide.

A shoulder 132*s* (FIGS. 7–9) is at the rear lower edge of slide 132. Shoulder 132*s* is adapted to engage the right end of a leftwardly extending lever 133 mounted at the underside of plate 64 of the keyboard. At the left end of lever 133 is an upwardly turned lug which engages an opening at the right end of a second leftwardly extending lever 134 which at its left end engages the front edge of a vertically disposed rear parallel link 136. Rear parallel link 136 is pivotally mounted at its upper end on a rod which is supported by plate 62 of the keyboard. A front parallel link 136 is pivotally mounted at its upper end on rod 63 and at its rear lower edge engages latch bail 65 of keys 61. A link 137 connects the lower ends of parallel links 136.

When shaft 128 is rocked counterclockwise, pin 130*p* of arm 130 will engage arm 132*a* of slide 132 and move slide 132 toward the rear. Accordingly, shoulder 132*s* of slide 132 will rock lever 133 counterclockwise and lever 134 clockwise. Clockwise movement of lever 134 engaging rear parallel link 136 will move the lower ends of the link and the connected front parallel link toward the rear. The rear movement of the front parallel link 136 will move bail 65 to release the latched-down key 61.

When slide 132 is moved rearwardly, latch means is operable to hold said slide in rear position after operating link 126 is restored by operation of clutch 105 in completing its cycle. The latch means however is effective as later described only if a key 61 is held manually against retraction when released by bail 65. The latch means comprises a crank 138 (FIG. 8) which is spring biased clockwise. A rearwardly extending arm of crank 138 terminates in a lug which engages the upper edge of slide 132. When slide 132 is moved rearwardly, a shoulder at its upper edge is moved to the rear of the lug of crank 138. The lug therefore will drop in front of the shoulder and block return forward movement of slide 132.

The rearward movement of slide 132 will cause operation of means for restoring bail 87 (FIG. 7) which released the operated link 72 from latch arm 76 and which holds said link with its shoulder 72*c* out of the path of the associated operating tooth 78 of rotating shaft 27.

The restoring means for bail 87 comprises a pin 132*p* (FIGS. 7, 8) on arm 132*a* of slide 132. Pin 132*p* engages an opening in an arm 139 which is loosely mounted on a rock shaft 140 which extends transversely beneath plate 64 of the keyboard. An arm 141 is fast on shaft 140 and has spring connection 142 with arm 139. Spring connection 142 normally holds arm 139 clockwise with respect to arm 141 with a limit stop on arm 139 engaging arm 141.

Shaft 140 has a longitudinal slot in which the edge of a plate 134 is secured. Plate 134 extends transversely below noses 61*a* at the lower ends of the stems of keys 61. When a key 61 is in depressed latched position, its nose 61*a* will be immediately adjacent the top side of plate 134 (FIG. 7A). Therefore as long as a key is in depressed position, shaft 140 will be restrained from counterclockwise movement for reasons later described.

A cam arm 143 (FIG. 7) fast on shaft 140 extends downwardly toward the rear and is adapted for engagement with a pin 88*p* on a depending arm of latch crank 88. A crank 144 on shaft 77 has a rearwardly extending arm overlying a pin 143*p* on arm 143. A rearwardly extending link 145 is pivotally mounted at its front at the end of a depending arm of crank 144 and has an open end slot at its rear slidably engaging a stud on the rightmost crank 85 of the pair of cranks which support bail 87.

As slide 132 is moved toward the rear, pin 132*p* will rock arm 139 counterclockwise and through spring connection 142 will tend to rock arm 141 in the same direction. However, at this time, arm 141 will be restrained from such movement by nose 61*a* of the latched-down key 61 blocking counterclockwise movement of plate 134. Spring 142 connecting arms 139, 141 therefore will yield. Immediately after slide 132 has been effective to release latched-down key 61, spring 142 will be effective to rock arm 141, and shaft 140 counterclockwise. Cam arm 143 fast on shaft 140 will therefore be rocked counterclockwise to engage pin 88*p* and rock latch crank 88 counterclockwise to raise nose 88*a* from latching engagement with shoulder 85*a* of crank 85.

During the above operation of cam arm 143, pin 143*p* will rock crank 144 counterclockwise thereby moving link 145 toward the rear. Near the end of the rearward movement of link 145, after release of latch 88, the end of the slot at the rear of said link will engage the stud of rightmost crank 85 and restore cranks 85 and bail 87 clockwise.

Near the end of the counterclockwise movement of arm 141, a pin 141*p* on the arm will engage a depending arm of crank latch 138 to rock said latch counterclockwise so that slide 132 may be restored.

As clutch 105 completes its cycle, cam 115 will permit follower 117 to be restored clockwise thereby restoring link 126 forwardly and permitting slide 132 and the parts operated thereby to be restored. The above restoring operations are effected immediately upon retraction of the depressed key and a second key depression will effect another selecting and printing operation.

A key 61 may be held in manually depressed position after it is released by bail 65, and after clutch 105 has completed its cycle with attendant reengagement of clutch 25. In such an instance, latch 138 will hold slide 132 in rear operated position. Spring 142 therefore will remain charged and upon release of the key, the spring will restore the parts in the same manner as previously described. The timing of the restoring operations after key retraction prevents repeated printing operations in response to a single key depression.

I claim:

1. In a printing mechanism: a rotary printing head; a carriage on which said head is mounted; means for shifting said carriage step by step to locate said head for successive printing operations; a normally engaged positive drive selection clutch having a driving member and a driven member including shoulder means for positive drive engagement; a clutch drive train for continuously driving said driving member of said clutch; a printing head drive train driven by said driven member of said clutch for rotatably driving said head; selection means for disengaging said clutch at any selected one of a plurality of angular positions and arresting rotation of said printing head with a selected one of said type in printing position; an operations positive drive clutch; control means in common to both said clutches and operable upon disengagement of said selection clutch to engage said operations clutch; and means operable by said operations clutch to effect a printing operation, operate said shifting means for one step of movement of said carriage, reengage said selection clutch and disengage said operations clutch after a single cycle of operation.

2. In a printing mechanism: a rotary printing head; a band of type on said head; a normally engaged positive drive clutch including a driving member and a driven member adapted for engagement with said driving member when said members are in a fixed relative rotational position, said members including shoulder means for positive drive engagement; a clutch train for continuously driving said driving member of said clutch; a printing head drive train driven by said driven member of said clutch for rotatably driving said head; selection means including rotary means driven in time with said driving member of said clutch and having a plurality of spaced elements thereon for disengaging said clutch and arresting rotation of said driven member of said clutch in any selected one of a plurality of rotational positions thereby arresting rotation of said printing head in a corresponding rotational position wherein one of said type is located in printing position; and means for effecting a printing operation and reengaging said clutch.

3. The invention according to claim 2: wherein said means for arresting rotation of said driven member of said clutch is operable to cause disengagement of said clutch.

4. In a printing mechanism: a rotary printing head; a band of type on said head; a positive drive clutch having normally engaged driving and driven members including shoulder means for positive drive engagement; a clutch drive train for continuously driving said driving member of said clutch; a printing head drive train driven by said driven member of said clutch for rotatably driving said head; a toothed control disc driven with said driven member of said clutch, each tooth of said disc corresponding to one of said type of said band; a spring urged detent operable to engage any selected one of said teeth to arrest rotation of said disc; means operable upon arrest of rotation of said disc to disengage said clutch and arrest rotation of said driven member of said clutch thereby arresting rotation of said printing head with the type corresponding to the engaged tooth in printing position; latch means for restraining said detent from engagement with said control disc; selection means operable to trip said latch to release said detent for engagement with a selected one of said teeth; and means for effecting a printing operation, disengaging said detent, and resetting said latch means.

5. The invention according to claim 4: wherein movement of said detent to engagement with any selected tooth of said control disc is operable to initiate operation of said means for effecting a printing operation, disengaging said detent, and resetting said latch means.

6. The invention according to claim 4: wherein said driving member and said driven member of said clutch are adapted for positive engagement when said members are in a fixed relative rotational position; and said selection means includes a plurality of control elements each corresponding to one of said teeth of said control disc and rotatably driven in time with said driving member of said clutch, and means operable by any selected one of said elements to trip said latch to release said detent for engagement with the tooth space corresponding to said selected element.

7. In a printing mechanism:
- a rotary printing head;
- a band of type on said head;
- a positive drive clutch having a driving member and a driven member including shoulder means for positive drive engagement;

- a drive train for continuously driving said driving member of said clutch;
- a drive train driven by said driven member of said clutch for rotating said printing head;
- control means for disengaging said clutch including means for disengaging said positive drive shoulder means and for arresting rotation of said driven member of said clutch in any one of a plurality of positions thereby arresting rotation of said printing head in a corresponding rotational position wherein one of said type is located in printing position; and
- means for selectively operating said control means.

8. In a printing mechanism:
- a rotary printing head;
- a band of type on said head;
- a positive drive clutch having a driving member and a driven member including shoulder means for positive drive engagement;
- a drive train for continuously driving said driving member of said clutch;
- a drive train driven by said driven member of said clutch for rotating said printing head;
- a clutch control member rotatably driven by said driven member of said clutch;
- means selectively operable to arrest rotation of said control member in any one of a plurality of positions; and
- means operable in response to arrest of rotation of said control member to disengage said clutch and arrest rotation of said driven member of said clutch in a position corresponding to the arrested position of said control member.

9. The invention according to claim 8:
- wherein said means selectively operable to arrest rotation of said clutch control member includes;
- a plurality of stop surfaces angularly spaced on said control member;
- an adjustable stop member normally out of the rotational path of said stop surfaces; and
- selection means for adjusting said stop member for engagement by any selected one of said stop surfaces to arrest rotation of said control member.

10. The invention according to claim 9:
- wherein said driving and driven members of said positive drive clutch are adapted for engagement when said members are in affixed rotational position; and
- said selection means for adjusting said stop member includes a shaft rotatably driven in said drive train for continuously driving said driving member of said clutch, a plurality of tooth elements helically positioned on said shaft each corresponding to one of said stop surfaces of said clutch control member, and a member selectively adjustable into the path of each tooth element for operation to cause adjustment of said stop member for engagement by the corresponding stop surface of said control member.

References Cited by the Examiner

UNITED STATES PATENTS

| | | | |
|---|---|---|---|
| 1,905,090 | 4/33 | Griffith | 197—18 |
| 2,382,668 | 8/45 | Salmon | 197—44 |
| 2,583,017 | 1/52 | Salmon | 197—18 |
| 2,643,753 | 6/53 | Wohlgemuth | 197—18 |
| 2,847,105 | 8/58 | Carroll | 197—16 |
| 2,919,002 | 12/59 | Palmer | 197—16 |
| 2,945,576 | 7/60 | Lapointe et al. | 197—18 |

WILLIAM B. PENN, *Primary Examiner.*

ROBERT A. LEIGHEY, ROBERT E. PULFREY, *Examiners.*